Aug. 25, 1964     C. B. ROGERS     3,145,865
MATERIAL HANDLING MACHINE
Filed June 29, 1961     2 Sheets-Sheet 2
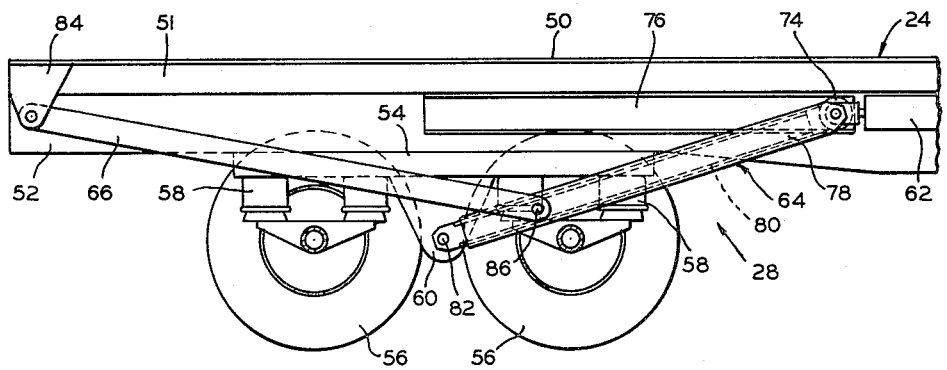
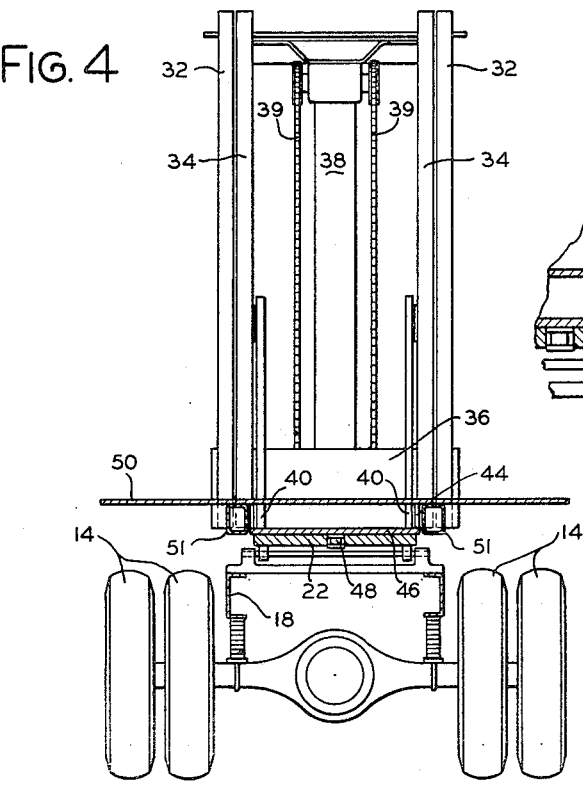
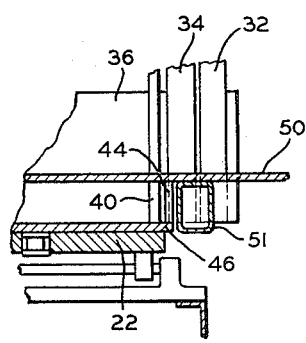
INVENTOR.
CYRIL B. ROGERS
BY
ATTORNEY United States Patent Office 3,145,865
Patented Aug. 25, 1964

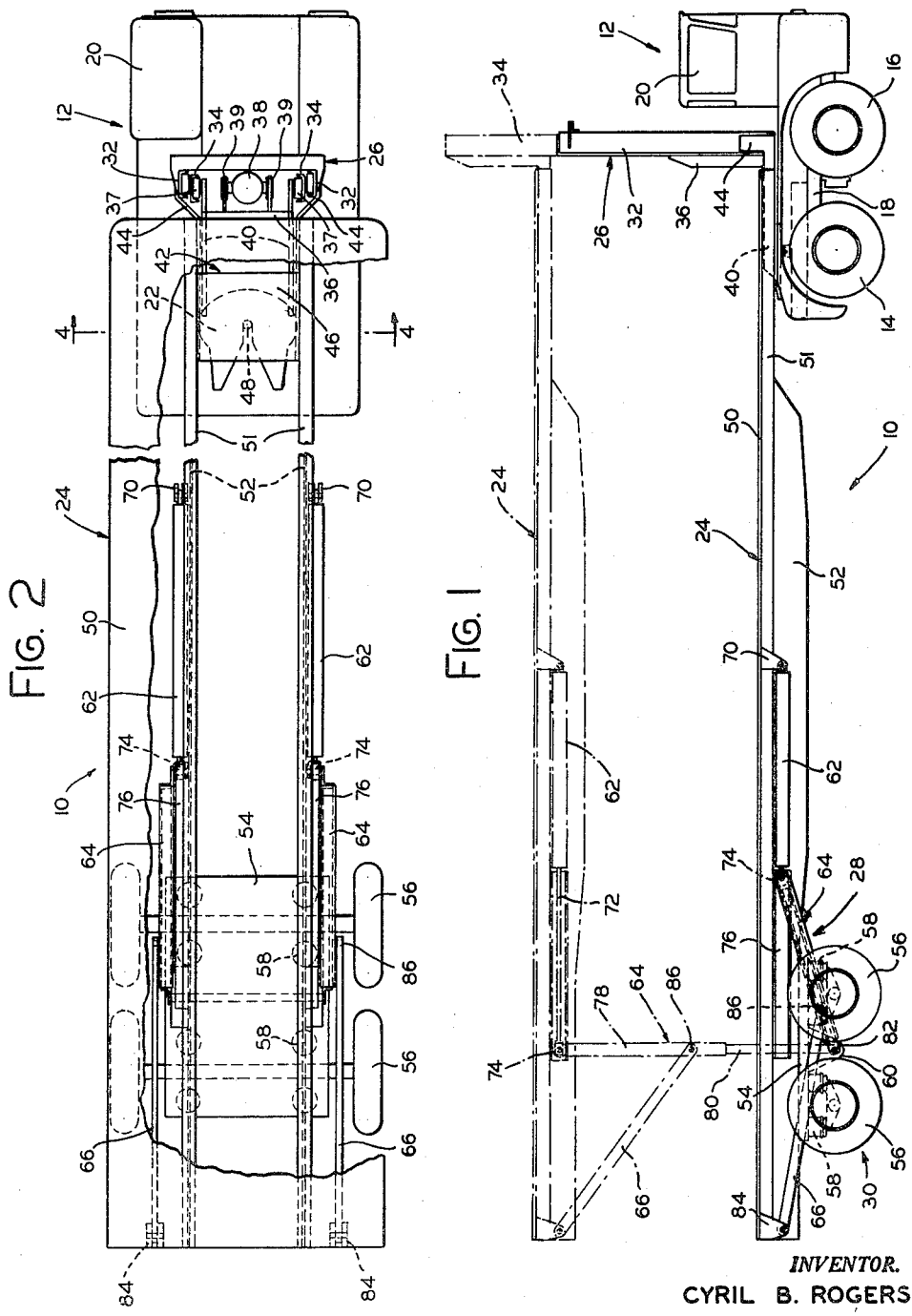

3,145,865
MATERIAL HANDLING MACHINE
Cyril B. Rogers, Battle Creek, Mich., assignor to Clark Equipment Company, a corporation of Michigan
Filed June 29, 1961, Ser. No. 120,582
6 Claims. (Cl. 214—512)

This invention relates to a material handling machine, and more particularly to a trailer having an elevatable bed.

A principal object of my invention is to provide an improved material handling machine for elevating a load to a selected height at which loading and unloading operations can be performed.

Another object of my invention is to provide improved lifting means for a trailer or the like with an elevatable bed.

A further object of my invention is to provide a relatively low-cost, simple and efficient elevator means of improved construction.

In carrying out my invention in one preferred form I provide an elevatable trailer bed which is connected adjacent one end to a tractor mounted conventional lifting upright and adjacent the other end to a plurality of fluid actuator assemblies located on opposite sides of the trailer bed and comprising first and second cooperable pairs of fluid actuators. The first pair of fluid actuators is secured to the trailer bed for extending movement longitudinally thereof and each one of the second pair is pivotally secured at one end to respective ones of the first pair and at the other ends to a ground engaging support assembly so that actuation of the first pair of actuators moves the second pair of actuators between an upwardly inclined position and a vertical position. The second pair of actuators may be energized when located in vertical position to elevate the trailer bed in cooperation with the lifting upright.

The above and other objects, features and advantages will become more apparent from the following detailed description when taken in conjunction with the drawing in which:

FIGURE 1 is a side elevational view of my invention attached to a tractor and showing the elevated position of the trailer bed in phantom outline;

FIGURE 2 is an enlarged plan view of the front and rear portions of FIGURE 1 and having a portion of the trailer bed broken away;

FIGURE 3 is an enlarged fragmentary view of the rear portion of FIGURE 1 wherein the wheels on the near side of the trailer are removed to better illustrate the lift and support assembly on the near side of the trailer;

FIGURE 4 is an enlarged sectional view taken along line 4—4 of FIGURE 2; and

FIGURE 5 is an enlarged fragmentary view of FIGURE 4.

Referring now in detail to the drawing, the numeral 12 identifies a tractor unit which comprises a pair of dual rear drive wheels 14, a pair of front dirigible wheels 16, a frame 18 supported upon wheels 14 and 16 and an operator's station or cab 20 supported by frame 18. Mounted upon the rear portion of frame 18 is a fifth wheel unit 22 by means of which a trailer 10 may be attached to tractor 12, as will be explained in more detail hereinafter.

The material handling machine or trailer 10 comprises an elevatable trailer bed or material support means 24 supported adjacent the front end thereof by a conventional lifting upright 26 which may be of the type utilized on industrial fork trucks, and supported adjacent the rear end thereof by a pair of transversely spaced lift and support assemblies 28 carried by a ground engaging wheel support assembly 30. The lifting upright 26 comprises generally a pair of laterally spaced fixed mast members 32 between which is disposed a pair of laterally spaced inner members 34 arranged for vertical reciprocal movement relative to members 32, a lifting carriage assembly 36 mounted in members 34 by a plurality of rollers 37 for vertical movement relative to members 34, and a vertically extending cylinder and piston-type fluid motor assembly 38 operatively connected to carriage 36 and inner slide 34 by means of sprocket and chain assemblies 39 carried by the piston for actuating vertically the carriage and inner slide assemblies. A detailed description of a suitable lifting upright similar to that described generally above will be found in U.S. application, Serial No. 760,744, filed September 12, 1958 (original filed June 4, 1956), now abandoned. Any suitable elevator means may be used for the purpose as will be apparent to persons skilled in the art. Attached to carriage 36 is a pair of longitudinally extending, transversely spaced fork arms 40 which are connected to trailer bed 24 in a manner to be explained. The lifting upright 26 is attached to tractor 12 by means of a connecting member or hitch 42 comprising a pair of rearwardly extending plate members 44 attached at one end to fixed mast members 32 and interconnected at the other end by a skid plate 46. When trailer 10 is attached to tractor 12 skid plate 46 rides on fifth wheel unit 22 and is held in place by means of a king pin 48 is a well-known manner.

The trailer bed 24 is actuatable between the fully lowered and fully elevated positions shown in FIGURE 1 and comprises a material support platform 50 reinforced by a pair of longitudinally extending, transversely spaced, hollow rectangular beam members 51, which are stiffened by longitudinally extending vertical plates 52 secured thereto by welding, for example. The front end of trailer bed 24 has the fork arms fixedly attached to the underside of platform 50 by any suitable means, such as welding.

The ground engaging support assembly 30 comprises a support plate 54 which is suspended above a pair of wheel and axle assemblies 56 by means of conventional air spring suspension units 58. Attached to each side of support plate 54 is a downwardly extending bracket 60 which is disposed intermediate the wheel and axle assemblies 56.

Each lift and support assembly 28 comprises a double-acting piston and cylinder type fluid actuator 62, a single-acting piston and cylinder type fluid actuator 64 and a brace member 66. The cylinder end of each actuator 62 is pivotally connected to the underside of platform 50 by means of a bracket and pin connection 70, the actuator 62 being disposed longitudinally of and adjacent plate 52. The piston rod 72 of each actuator 62 has rotatably mounted adjacent the outer end thereof a roller 74 which is arranged to roll along a C-shaped channel guide member 76 which is disposed longitudinally of and secured to the underside of beam member 51 adjacent each plate 52. The cylinder end of each actuator 64 is pivotally connected to piston rod 72 coaxially with roller 74. The outer end of piston rod 80 of each actuator 64 is pivotally connected to braket 60 by a pin 82 so that actuator 64 is pivotal from a forwardly and upwardly inclined position when the trailer bed 24 is lowered to a substantially vertical position when the trailer bed 24 is elevated by actuators 62. Each brace member 66 is pivotally connected at one end to the underside of platform 50 adjacent one rear corner portion thereof by means of a pin and bracket connection 84 and is pivotally connected adjacent its other end to corresponding cylinder member 78 at a location intermediate the ends of cylinder 78 by a pin member 86. Brace members 66 serve to prevent wheel support assembly 30 from being pushed rearwardly when fluid motors 62 are actuated to pivot fluid motors 64 from their forwardly inclined position to a substantially vertical position.

Fluid conduits for communicating actuators 38, 62 and 64 with a source of fluid pressure have been omitted from the drawing in the interest of clarity. However, it will be appreciated that in practice actuators 38, 62 and 64 are suitably connected to a fluid pressure control means for controlling communication of pressure fluid with actuators 38, 62 and 64 as required.

Turning now to the operation of my invention, it will be assumed that it is desired to load cargo from trailer bed 24 into a cargo space located at a considerable distance above the ground, such as is found in large cargo handling aircraft. The trailer 10 is positioned beneath the cargo space and the trailer bed 24 is then raised to the required elevation at which the cargo is moved from the trailer bed 24 into the cargo space. In order to elevate trailer bed 24, pressurized fluid is conducted to the various aforementioned fluid actuators, thus causing carriage 40 of upright 26 to elevate one end of trailer bed 24 and lift and support assemblies 28 to elevate the other end thereof. More specifically, as actuator 38 is energized, thus causing the front end of the trailer bed to rise with carriage 36, actuators 62 are also energized so that actuators 64 are pivoted from a forwardly and upwardly inclined position to a vertical position. When actuators 62 are fully extended, actuators 64 are in their vertical position and bed 24 is in an intermediate elevated position. In order to further elevate bed 24, actuators 64 are now energized simultaneously with actuator 38. It is desirable, of course, to synchronize the flow of pressure fluid into actuators 38, 62 and 64 in order to maintain bed 24 in a level position. Lowering of trailer bed 24 is achieved by simply reversing the procedure for elevating it.

While I have shown only a preferred embodiment of my invention, it will be apparent to persons skilled in the art that various changes, modifications and rearrangements of structure may be made without departing from the scope of my invention.

I claim:

1. A material handling machine comprising elevatable material support means, first lift means connected to said material support means, ground engaging support means connected solely to said material support means, and second lift means connected to said material support means in spaced relation to said first lift means and supported by said ground engaging support means, said second lift means comprising a fluid motor connected pivotally adjacent one end to said ground engaging support means for actuation between two extreme positions and operatively connected adjacent the other end to said material support means for pivotal and longitudinal movement relative thereto, means connected between said fluid motor and said material support means for actuating said fluid motor between said extreme positions to elevate said material support means, and brace means interconnecting said fluid motor and said material support means, said fluid motor being energizable to further elevate said material support means following actuation thereof to one of said positions by said actuating means.

2. A trailer comprising an elevatable trailer bed, first lift means connected to said trailer bed, ground engaging support means connected solely to said trailer bed, and second lift means connected to said trailer bed in spaced relation to said first lift means and supported by said ground engaging support means, said second lift means comprising a first fluid motor pivotally connected adjacent one end to said ground engaging support means for actuation between two extreme positions and operatively connected adjacent the other end to said trailer bed for pivotal and longitudinal movement relative thereto, a second fluid motor connected to said trailer bed and said first fluid motor for actuating said first fluid motor between said extreme positions, and a rigid brace member pivotally connected adjacent one end to said trailer bed and pivotally connected adjacent the other end to said first fluid motor.

3. In combination, a trailer having an elevatable bed, a ground engaging support assembly connected only to the said elevatable bed, first lifting means connected to the bed, and second lifting means connected to said bed in spaced relation to said first lifting means and supported by said support assembly, said elevatable bed forming the sole connection between said first and second lifting means, said second lifting means comprising motor means pivotally connected adjacent one end to said support assembly for actuation between a first inclined position and a substantially vertical position and operatively connected adjacent the other end to said bed for pivotal and longitudinal movement relative thereto, means connected to said elevatable bed and said motor means for actuating said first motor means between said above-mentioned positions and a brace member pivotally connected adjacent one end to said bed and adjacent the other end to said first motor means.

4. In a trailer having an elevatable bed and a ground engaging support assembly connected only to the elevatable bed, lift means comprising a pair of transversely spaced lift support assemblies, each said lift and support assembly comprising a first fluid motor having a cylinder and a piston rod, said first fluid motor being pivotally connected adjacent one end of said piston rod to the ground engaging support assembly for actuation between a forwardly inclined position and a substantially vertical position, means for connecting said first fluid motor adjacent one end of said cylinder to the elevatable bed for pivotal and longitudinal movement relative thereto, said last-mentioned means including a longitudinally extending channel member secured to the elevatable bed and a roller mounted for rotation adjacent said one cylinder end and arranged to run along said channel member, a second fluid motor connected adjacent one end of the elevatable bed and connected adjacent the other end thereof to said cylinder for actuating said first fluid motor between said inclined and vertical positions, and a rigid member pivotally connected to said cylinder and the elevatable bed.

5. A trailer comprising an elevatable bed, a ground engaging support assembly connected solely to said elevatable bed, first and second spaced lift means, said elevatable bed being the sole connection between said first and second lift means, said first lift means including a first fluid motor pivotally connected adjacent one end to said support assembly for actuation between a first position and a substantially vertical position, means for operatively connecting said first fluid motor at the other end thereof to said elevatable bed for pivotal and longitudinal movement relative thereto, a second fluid motor connected at one end to said elevatable bed and connected at the other end thereof to said first fluid motor for moving said first fluid motor between said above-mentioned positions and a rigid brace member pivotally connected at one end to said first fluid motor and at the other end thereof to the said elevatable bed.

6. A material handling machine comprising a load support member, a ground engaging member connected solely to the said load support member, first lift means connected to the said load support member, and second lift means connected between the said members and forming the sole connection between the said members, the said second lift means including a fluid motor connected adjacent one end thereof to one of the said members for pivotal movement between two extreme positions and connected adjacent the other end thereof to other of the said members for pivotal and longitudinal movement relative thereto, means connected to the said fluid motor and the said other member for actuating the said fluid motor between the said extreme positions to elevate the said load support member and a rigid brace pivotally connected between the said fluid motor and the said other member.

References Cited in the file of this patent

UNITED STATES PATENTS

| | | |
|---|---|---|
| 2,319,840 | Barrett | May 25, 1943 |
| 2,576,158 | Wallace | Nov. 27, 1951 |
| 2,686,038 | Dutzman | Aug. 10, 1954 |
| 3,042,228 | Frangos | July 3, 1962 |
| 3,051,340 | Ely | Aug. 28, 1962 |